3,035,493
MIRROR
Peter Schlumbohm, 41 Murray St., New York, N.Y.
Filed Dec. 24, 1959, Ser. No. 861,977
4 Claims. (Cl. 88—96)

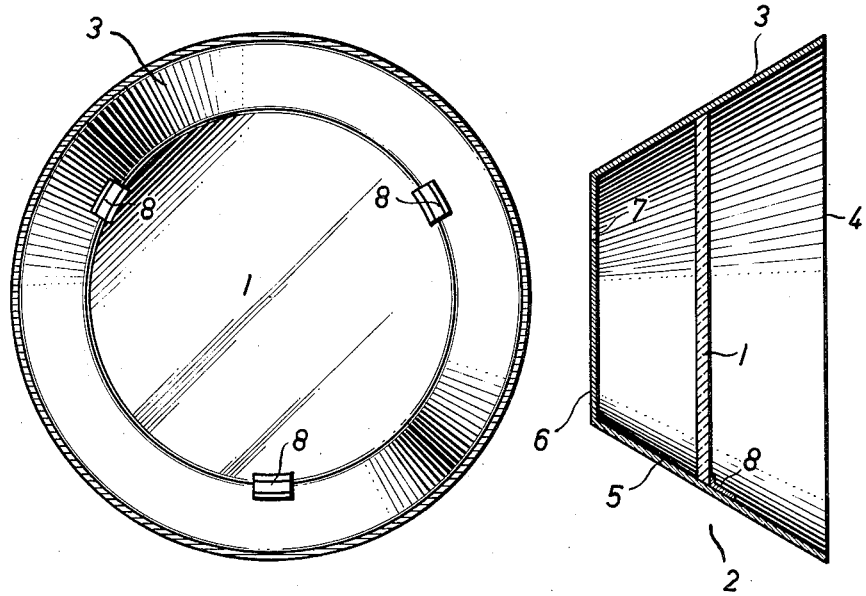
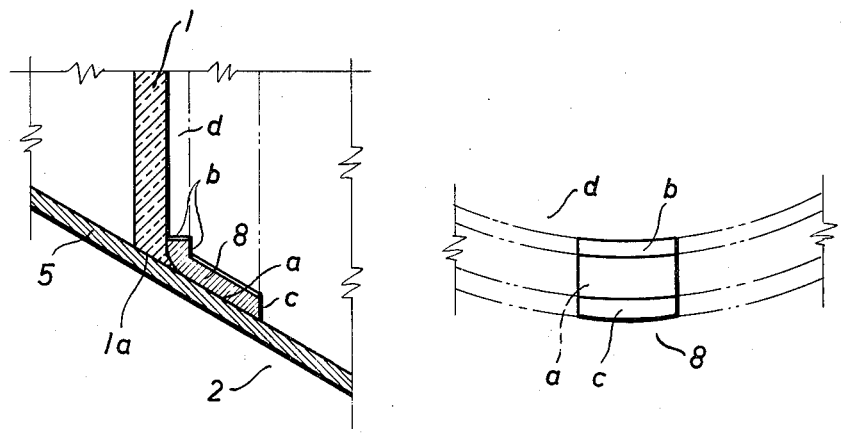

The invention relates to toilet mirrors and is illustrated, by way of example, in FIG. 1–FIG. 4 of the accompanying drawings.

FIG. 1 is a front view, as appearing when the user looks into the glass.

FIG. 2 is a side view of the mirror shown in FIG. 1, in vertical cross section.

FIG. 3 shows, enlarged, a section of FIG. 2.

FIG. 4 is a top view of a detail element and illustrates diagrammatically its manufacturing.

The invention creates a mirror, which solves several problems of "modern living" in modern apartments, where one cannot drive a nail into flimsy walls without breaking off some plaster and paint, and where a desk mirror can be installed on a table only temporarily while using the table for making up. Moreover, it offers a very functional grip for the hand, when used as a hand-mirror.

Following the invention, the looking glass 1 is mounted in a frame 2, which is formed as a hollow truncated cone 2, with an open front 4, a bottom wall 6 and conical sidewalls having their section of largest diameter at the open front 4 and their section of smallest diameter at the bottom wall 6.

In the example shown, the hollow truncated cone has a cross section of a true circle, and the mirror 1 is true round. As shown in FIG. 3, the edge (1a) of the mirror 1 is bevelled to correspond to the conicity of the conical sidewalls. As shown in FIG. 2, the diameter of the mirror 1 is chosen to fit about halfway of the depth of the hollow truncated cone 2, parallel to the bottom wall 6. Following the invention, all that is needed to fixate the mirror in this position are three blocks 8 in front of the mirror 1, which cooperate with the conical side walls adjacent the edge of the mirror and behind the mirror to block any movement of the mirror 1.

Following the invention, the side walls and the blocks are made from a cushioning material, such as a plastic manufactured by the U.S. Rubber Co. under the trademark Royalite. This is a protection for the breakable mirror. It also allows cementing the blocks 8 to the inside surface of the side walls, thus avoiding metal parts which also would jeopardize the mirror during assembling.

To make a good bond possible, the block 8 must have an outer surface a, which has the same conicity and the same arc as the inner surface of the conical sidewall to which it is to be cemented. Furthermore the block 8 should contact the glass 1 with a surface, which is parallel to the surface of the glass, and there should be some "spring action" provided in this section b of the block 8. To create this intricate element, I manufacture first a full circle ring element, which in cross-section looks like the cross section of element 8 in FIG. 3, and which in top view looks like the top view of element 8 in FIG. 4. FIG. 4 indicates diagrammatically then that the block 8 is cut from the full circle ring element, which has an inside diameter slightly smaller than the largest diameter of the glass 1.

Vacuum-forming of the plastic material makes it possible to form the hollow cone 2 and the ring-element for cutting the blocks with sufficient accuracy to provide a lasting bond by cementing.

As illustrated in FIG. 2, the section 3 of the conical sidewalls, which lies in front of the mirror 1, form a "shadow-box," which improves greatly the optical effect of any mirror.

The section 5 of the conical side walls, which lies behind the mirror 1 is chosen to be of sufficient length to form a base for the mirror, without its toppling backward, when the mirror is placed on a table, resting on the conical side walls. In this position, the mirror 1 is held at a convenient angle for the viewer, in the example shown at a 60° angle.

The bottom wall 6 has a hole 7 for a nail to hang the mirror at a wall. Neither the nail nor broken out plaster will show, and the bottom wall 6 rests flush against the wall. The bottom wall also cooperates with the mirror to maintain a sufficient rigidity of the conical side walls, preventing their deformation by manual twisting, which would loosen the mirror 1.

The section 3 of the sidewalls, with their conical and arced surface offers a very functional grip for the hand, accessible in any position of the mirror.

The invention is not limited to the example shown of a round mirror in a conical element of true-circle cross section.

I claim as my invention:

1. A mirror of predetermined dimensions, comprising a looking glass and a supporting frame, said looking glass being mounted within a frame-body in the shape of a hollow truncated cone, having a bottom wall, conical side walls flaring outwardly from said bottom wall and an open top, said sidewalls having zones of smallest diameter, of intermediate diameter and of largest diameter; said looking glass corresponding in its diameter to the diameter of the frame in its section of intermediate diameter and having a beveled edge with a bevel corresponding to the angle of the side walls of the frame-body and fitting with its peripheral edge closely into the zone of intermediate diameter, supported at its back by adjacent parts of sidewalls of smaller diameter and supported on its front side by blocking elements fastened to the sidewalls of larger diameter.

2. In a mirror as claimed in claim 1, the sidewalls in the zone of smaller diameter than the intermediate diameter having a sufficient length to serve as a base for the mirror and to prevent its toppling over backward, when the frame-body is resting on a table.

3. In a mirror as claimed in claim 1, said blocking elements being strip elements with an inner and an outer surface, said outer surface having the same conicity and the same arc as the inner surface of the sidewalls at the spot where they are to be fastened to said side walls.

4. A mirror as claimed in claim 1, in which the frame-body and the blocking elements are made from a glass-cushioning material.

References Cited in the file of this patent

UNITED STATES PATENTS

| | | |
|---|---|---|
| 886,273 | Tanzey | Apr. 28, 1908 |
| 1,556,648 | Symms | Oct. 13, 1925 |
| 2,197,184 | Kemp | Apr. 16, 1940 |
| 2,752,823 | Martin et al. | July 3, 1956 |
| 2,831,398 | Tiegler | Apr. 22, 1958 |